(12) United States Patent
Matthews et al.

(10) Patent No.: US 10,686,687 B2
(45) Date of Patent: Jun. 16, 2020

(54) INTEGRATED PERSONAL SAFETY AND EQUIPMENT MONITORING SYSTEM

(71) Applicant: Aware360 Ltd., Calgary (CA)

(72) Inventors: Steven Gregory Matthews, Calgary (CA); James Frederick McLellan, Calgary (CA); Robert Wyatt Forget, Calgary (CA); James Paul McDade, Calgary (CA)

(73) Assignee: AWARE360 LTD., Calgary, Alberta (CA)

( * ) Notice: Subject to any disclaimer, the term of this patent is extended or adjusted under 35 U.S.C. 154(b) by 244 days.

(21) Appl. No.: 15/829,558

(22) Filed: Dec. 1, 2017

(65) Prior Publication Data

US 2018/0159756 A1    Jun. 7, 2018

Related U.S. Application Data

(60) Provisional application No. 62/430,110, filed on Dec. 5, 2016.

(51) Int. Cl.
*G06F 15/173* (2006.01)
*H04L 12/26* (2006.01)
(Continued)

(52) U.S. Cl.
CPC ............ *H04L 43/12* (2013.01); *G06F 21/552* (2013.01); *H04L 41/0873* (2013.01);
(Continued)

(58) Field of Classification Search
CPC ..... H04L 43/12; H04L 43/16; H04L 43/0817; H04L 41/0873; H04L 41/0609; H04L 41/16; H04L 63/1425; G06F 21/552
(Continued)

(56) References Cited

U.S. PATENT DOCUMENTS 6,389,464 B1    5/2002   Krishnamurthy et al.
7,886,031 B1    2/2011   Taylor et al.
(Continued)

FOREIGN PATENT DOCUMENTS

JP    2007-296326        11/2007
WO    2015/142300 A1     9/2015

*Primary Examiner* — Wing F Chan
*Assistant Examiner* — Joseph R Maniwang
(74) *Attorney, Agent, or Firm* — Heslin Rothenberg Farley & Mesiti P.C.; Victor A. Cardona, Esq.

(57) ABSTRACT

A monitoring and messaging system for monitoring status of a plurality of assets. The system includes a data collection and normalization module configured to accept data originating from a plurality of sensors and to convert the data to normalized data for subsequent processing by the system. The system has an identification module configured to receive the normalized data and assign a subset of the normalized data generated by one or more specific sensors of the plurality of sensors to an asset selected from a plurality of assets. The system has an analysis module which includes a database of asset rules defining status states of the asset. The analysis module is programmed to receive and compare the subset of normalized data with a subset of asset rules to determine a status state of the asset. The system also has an action module which is configured to receive the status state of the asset, generate a message representing the status state of the asset and to transmit the message to a concerned party.

18 Claims, 3 Drawing Sheets

(51) Int. Cl.
  *H04L 12/24*  (2006.01)
  *G06F 21/55*  (2013.01)
  *H04L 29/08*  (2006.01)
  *H04W 4/38*  (2018.01)
  *H04L 29/06*  (2006.01)

(52) U.S. Cl.
  CPC .............. *H04L 43/16* (2013.01); *H04L 67/02* (2013.01); *H04W 4/38* (2018.02); *H04L 41/0609* (2013.01); *H04L 41/16* (2013.01); *H04L 43/0817* (2013.01); *H04L 63/1425* (2013.01)

(58) Field of Classification Search
  USPC ......................................................... 709/224
  See application file for complete search history.

(56) References Cited

U.S. PATENT DOCUMENTS

| | | |
|---|---|---|
| 9,378,361 B1 | 6/2016 | Yen et al. |
| 9,492,092 B2 | 11/2016 | McCombie et al. |
| 2007/0174438 A9 | 7/2007 | Johnson et al. |
| 2008/0097913 A1 | 4/2008 | Dicks et al. |
| 2011/0156886 A1 | 6/2011 | Clinkscales et al. |
| 2013/0340084 A1* | 12/2013 | Schrecker ............ G06F 21/577 726/25 |
| 2014/0131434 A1 | 5/2014 | Ozkan |
| 2016/0028606 A1 | 1/2016 | Cole et al. |
| 2016/0093197 A1 | 3/2016 | See et al. |
| 2016/0153806 A1* | 6/2016 | Ciasulli ............... G06F 11/0751 702/184 |
| 2016/0247129 A1 | 8/2016 | Song et al. |
| 2017/0262756 A1* | 9/2017 | McElhinney ....... G01M 99/008 |

* cited by examiner a patient's vital signs (e.g. blood pressure, SpO2, heart rate, respiratory rate, and temperature) while simultaneously characterizing the patient's activity state (e.g. resting, walking, convulsing, falling). The body-worn monitor processes this information to minimize corruption of the vital signs by motion-related artifacts. A software framework generates alarms/alerts based on threshold values that are either preset or determined in real time. The framework additionally includes a series of "heuristic" rules that take the patient's activity state and motion into account, and process the vital signs accordingly.

INTEGRATED PERSONAL SAFETY AND EQUIPMENT MONITORING SYSTEM

CROSS-REFERENCE TO RELATED APPLICATIONS

This application claims priority from U.S. Provisional Application Ser. No. 62/430,110 filed Dec. 5, 2016, which is incorporated herein by reference in its entirety.

FIELD OF THE INVENTION

The invention relates to sensor-based monitoring of individuals and equipment via connection of multiple devices and/or sensors to a monitoring system via multiple communication modes with messaging provided to monitoring and response centers to ensure safety of individuals and proper functioning of equipment.

BACKGROUND

Many individuals live and/or work in potentially dangerous locations or environments or with health conditions where safety and/or health monitoring is required. To date, current processes and technology have been poorly leveraged to address this issue. Very few solutions exist to handle the myriad of combinations of conditions, locations or activity and solutions do not enable a guaranteed outcome by relying on potentially unreliable processes. The lack of solutions results in poor outcomes due to a lack of early warning or prevention, data capture and action or poor response times to people with ill health and injuries. The current outcomes result in poorer health states for the person, and increased costs.

Businesses are increasingly managed from a centralized facility through leveraging technology. Individuals are increasingly deployed to potentially dangerous locations or work with potentially dangerous equipment often with few tools to ensure their security, safety and effectiveness. This often results in increased business risk and costs when employees need assistance due to accidents or workplace violence or when assets stop working properly.

There is a need for further development of systems for flexibly monitoring safety of individuals and proper functioning of equipment.

U.S. Patent Publication 2007/0174438, incorporated herein by reference in its entirety, describes a system for receiving and normalizing notification events from assets or equipment located at various sites within an enterprise. The system includes receiving a notification, identifying the protocol used by the equipment sending the notification, and converting the notification to a normalized format. The system allows notifications from various types of equipment or assets to be handled by one enterprise management system.

U.S. Patent Publication No. 2016/0028606, incorporated herein by reference in its entirety, describes a system including a probe controller associated with a host device and configured to abstract a plurality of device-specific monitoring operations associated with a plurality of heterogeneous host devices to a normalized set of monitoring operations. The probe controller facilitates monitoring of the host device using the normalized set of monitoring operations. The system also includes a first specialized probe module associated with the host device and configured to provide device-specific information in response to the normalized set of monitoring operations. The first specialized probe module accesses, in response to receiving a notification from the probe controller to determine a metric associated with the host device, the metric associated with the host device. The first specialized probe module communicates the metric to the probe controller.

US Patent Publication No. 2016/0247129, incorporated herein by reference in its entirety, describes a system for using digital twins for scalable, model-based machine predictive maintenance. The system comprises a plurality of digital twins and a simulation platform. The plurality of digital twins corresponds to a plurality of remotely located physical machines. Each respective digital twin comprises: product nameplate data corresponding to a unique physical machine, one or more simulation models, and a database comprising run time log data collected from sensors associated with the unique physical machine. The simulation platform is configured to process simulation models corresponding to the plurality of digital twins using a plurality of multiprocessor computer systems.

US Patent Publication No. 2011/0156886, incorporated herein by reference in its entirety, describes a system for interfacing between medical devices using different output protocols and medical personnel. A user may configure the system to accept different external device outputs on different input ports of the system. The system may be programmed to correctly associate the input signals with alert conditions based upon the particular input device connected to the particular input port. The system may also be configured to send status information from the input devices to medical personnel by transmitting a message utilizing the output protocol appropriate to the communication system used by the medical personnel requiring the information.

U.S. Pat. No. 9,492,092, incorporated herein by reference in its entirety, describes a body-worn monitor that measures U.S. Pat. No. 7,886,031, incorporated herein by reference in its entirety, describes a SAN (storage area network) configuration utility used to automatically configure a SAN management system for SAN discovery and management. The SAN configuration utility may be used to identify and verify SAN devices, device firmware, device drivers, etc. for the SAN management system, and to configure the SAN management system to support one or more previously incompatible SAN devices.

US Patent Publication No. 2008/0097913, incorporated herein by reference in its entirety, describes a method which includes the steps of receiving data wirelessly from a plurality of medical devices, transmitting the data to an intermediary device (such as a properly equipped mobile telephone or personal digital assistant), and formatting a message including the received data for transmission to a medical data server. This method can be practiced automatically to allow a medical device for a patient or other subject to be monitored without requiring the patient to manually enter information. This method also allows for multiple different medical devices to be monitored, even where such devices each communicate on different frequencies and/or using different communication protocols.

US Patent Publication No. 2016/0093197, incorporated herein by reference in its entirety, describes a personal monitoring and emergency communications system including a wrist worn apparatus carried by a monitored person for minimizing response time during an emergency. The system includes an array of sensors for periodically sensing vital biometric parameters of the monitored person and a memory for storing and comparing the sensed parameters to a pre-stored standard range of the vital parameters for providing a comparator signal. The system also has an alarm circuit for evaluating the comparator signal for providing an emergency alarm signal when the vital parameters are not within the pre-stored standard range, and a signal transmitter for providing activation, encoding and immediate broadcasting of the alarm signal from the wrist worn apparatus to a dispatcher call center via a communication link. The alarm signal includes the vital parameters and exact location of the monitored person. The dispatcher call center communicates with a medical response team closest to the monitored person.

U.S. Pat. No. 6,389,464, incorporated herein by reference in its entirety, describes a site server to which devices to be managed are connected. The site server is configurable from remote locations using internet browser technology. The site server is Web-configurable to manage different types of devices without requiring device-specific software development. Alarm events, alert monitoring, remote monitoring and remote trouble-shooting are web-enabled. Device information can be accessed globally via a web or internet browser. The site server can deliver device information via facsimile, paging, electronic mail and management traps. The site server permits connection of different types of devices, including standards-compliant devices and non-compliant devices which may be from different vendors.

U.S. Pat. No. 9,378,361, incorporated herein by reference in its entirety, describes a threat detection system for detecting threat activity in a protected computer system. The system includes anomaly sensors of distinct types including user-activity sensors, host-activity sensors and application-activity sensors. Each sensor builds a history of pertinent activity over a training period, and during a subsequent detection period the sensor compares current activity to the history to detect new activity. The new activity is identified in respective sensor output. A set of correlators of distinct types are used that correspond to different stages of threat activity according to modeled threat behavior. Each correlator receives output of one or more different-type sensors and applies logical and/or temporal testing to detect activity patterns of the different stages. The results of the logical and/or temporal testing are used to generate alert outputs for a human or machine user.

International Patent Publication No. WO2015/142300, incorporated herein by reference in its entirety, describes a system wherein all data received from information technology assets such as a computer or a network switch or a sensor in different domains such as software, network, hardware or industrial systems in a production field is collected in one pool, ontologies are created based on the operation of the assets and their interactions by determining working relations between the assets and using these working relations, and are inspected using an effect analysis method and a root cause analysis method, characterized by comprising a triple storage database to which ontology scheme files are conveyed, a content addition unit through which assets are added to the system, an inference engine allowing a rule-based inference on the ontologies, an effect analysis unit determining the effect that may occur in consequence of alarm data, and a root cause analysis unit determining the reason of the alarms.

Japan Patent Publication No. 2007296326, incorporated herein by reference in its entirety, describes a system and method for monitoring posture movement of a patient. Networks for constituting devices in various levels detect data, process and transmit the data between the constituting devices, and self-organize into peer group layers of the constituent devices to perform tasks or functions for monitoring a posture and movement of a patient. A general peer group includes various lower level pier groups with constituting devices. Detections, calculations, data variances, or communication tasks of various levels are performed by adjustment of functions such as communication and others between a plurality of relatively simple constituent devices of the networks. Tasks and functions of network constituent devices are adjusted by using communication protocols of symmetric and asymmetric codes and others. When a posture and movement out of a tolerance range is detected, an alarm signal may be transmitted to the patient, a doctor and other caregivers.

U.S. Pat. No. 7,207,041, incorporated herein by reference in its entirety, describes open platform architecture and methods for shared resource access management. A redirection module in kernel space receives requests for access to resources from applications in user space. The redirection module routes signals representative of the received requests to a device driver interface in user space. Components of the device driver interface include resource management modules and device drivers that correspond to available resources. The resource management modules generate queries to the device drivers regarding availability of the requested resources. Upon receipt of resource status information from the device drivers, components of the device driver interface generate schedules for granting access to the requested resources. Further, the device driver interface components control access to the resources in accordance with the generated schedules including issuing responses to the requesting applications and the device drivers of the requested resources.

U.S. Patent Publication No. 2003/0120826, incorporated herein by reference in its entirety, describes a system for enabling a wireless wide area network communication capable of aggregating and disseminating information for the telematics domain, without the need of additional external network infrastructure, such as communication towers and central switch. The invention offers a new method for telematics, wherein each network object communicates only with network objects in its immediate surrounding using WLAN/PAN technologies. The information reaches remote network objects by continues exchanges of information between close network objects using WLAN/PAN technology. The system includes an aggregating disseminating communication component (ADCC) that is added to each network object. The ADCC collects traffic related information and builds an internal traffic map of the area. The underlying network object can initiate transmission of information using the ADCC. The ADCC is capable of receiving information and, if needed, the received information is updated via the underlying network object. The information is then exchanged to the next network object.

U.S. Patent Publication No. 2012/0010906, incorporated herein by reference in its entirety, describes a method for providing a customer with a competitive insurance quote from an insurance carrier includes collecting driving information relating to a customer for a time period, generating a driving report for the time period, providing the driving report to at least two potential insurance carriers, requesting insurance bids from the potential insurance carriers, and sending at least one of the insurance bids to the customer.

U.S. Patent Publication No. 2005/0182534, incorporated herein by reference in its entirety, describes a method of acquiring vehicle data from a vehicle data bus is disclosed. The method is responsive to the execution of a telematics application on a local telematics unit. The method comprises first accessing a local vehicle library, in response to vehicle data requests from the application. The local vehicle library then carries out steps comprising: retrieving vehicle data bus information from a database; using the vehicle data bus information to extract vehicle data from the vehicle data bus, the vehicle data corresponding to the requests for vehicle parameter data; interpreting the retrieved vehicle data; and providing the interpreted data to the telematics application to satisfy the request for vehicle data.

U.S. Patent Publication No. 2008/0319665, incorporated herein by reference in its entirety, describes methods, systems, and apparatuses for aftermarket telematics. In one aspect, there is provided an apparatus comprising a telematics control unit configured for consumer installation, consumer use, and the like. The apparatus can be installed in a vehicle. In another aspect, provided are systems and methods for operation of the apparatus.

U.S. Patent Publication No. 2013/0183924, incorporated herein by reference in its entirety, describes a system which establishes a perimeter around an area, and mobile devices within the established perimeter communicate with a server that provides and collects personal and asset safety information. The provided information might enable users associated with the mobile devices to plan actions or take routes based on a given criteria, such as a safest route, through display on the mobile device. The collected information from the mobile device might be location, emergency event, environmental factors, sensor information and the like, which might then be communicated to users and/or administrators of the system. Location information, such as a global positioning system (GPS), might provide tracking of mobile devices and users or assets associated with each mobile device. GPS functionality associates latitude, longitude and elevation (X-Y-Z coordinate axis) data with the collected and provided information.

U.S. Patent Publication No. 2011/0111728, incorporated herein by reference in its entirety, describes a system and method for providing a conduit to send information to emergency services from a wireless device. Also described are systems and methods for registering an alarm button on a wireless device and sending to public and/or private emergency services providers information related to the wireless device including its location, information about a wireless device end user and/or subscriber associated with the wireless device, and information recorded by one or more wireless devices during and subsequent to the time the alarm button is activated.

There continues to be a need for improvements in sensor-based monitoring of individuals and equipment via connection of multiple devices and/or sensors to a monitoring system to ensure safety of individuals and proper functioning of equipment.

SUMMARY

In accordance with one embodiment of the invention, there is provided a monitoring and messaging system for monitoring status of a plurality of assets, the system comprising: a data collection and normalization module configured to accept data originating from a plurality of sensors and to convert the data to normalized data for subsequent processing by the system; an identification module configured to receive the normalized data and assign a subset of the normalized data generated by one or more specific sensors of the plurality of sensors to an asset selected from a plurality of assets; an analysis module comprising a database of asset rules defining status states of the asset, the analysis module programmed to receive and compare the subset of normalized data with a subset of asset rules to determine a status state of the asset; and an action module configured to receive the status state of the asset, generate a message representing the status state of the asset and transmit the message to a concerned party.

Another embodiment of the invention is a monitoring and messaging system for monitoring status of a plurality of assets, the system comprising: a data collection and normalization module configured to accept data originating from a plurality of sensors and to convert the data to normalized data for subsequent processing by the system; an identification module configured to receive the normalized data and assign a subset of the normalized data generated by one or more specific sensors of the plurality of sensors to an asset selected from a plurality of assets; an analysis module comprising a database of asset rules defining status states of the asset, the analysis module programmed to receive and compare the subset of normalized data with a subset of asset rules to determine a status state of the asset; and an action module configured to receive the status state of the asset, generate a message representing the status state of the asset and transmit the message to a concerned party, the action module including action rules dictating whether or not action is required by the concerned party in response to a change in the status state of the asset.

In certain embodiments, the system, further comprises a sharing module with a graphical user interface allowing a user to view a representation of the plurality of sensors and the plurality of assets and to change the asset rules and definitions of the status states.

In certain embodiments, each one of the plurality of assets comprises one or more individuals, one or more units of equipment including vehicles, one or more buildings or structures, one or more defined locations, or any combination thereof.

In certain embodiments, the identification module is in data communication with a user interface for linking data originating from the specific sensors with the asset, thereby providing ability to change the definition of the asset.

In certain embodiments, the data collection and normalization module comprises an identification database including identification information for the plurality of sensors and the plurality of assets.

In certain embodiments, the identification database is configured to store data generated by the plurality of sensors.

In certain embodiments, the identification module is programmed to prevent unauthorized assignment of a given sensor of the plurality of sensors to a given asset.

In certain embodiments, the analysis module is in data communication with an application programming interface for adding, removing or modifying the asset rules, thereby providing ability to change the definitions of status states.

In certain embodiments, the analysis module includes a database which includes the relationships between specific sensors of the plurality of sensors with specific assets of the plurality of assets.

In certain embodiments, the concerned party is any one of or a combination of a rescue response team, a repair or maintenance team and a medical response team.

In certain embodiments, the concerned party is an individual associated with the asset and the message is routed back through the system and translated in the data collection and normalization module to data readable by a device associated with the asset.

In certain embodiments, the action module stores a copy of the transmitted message in a message database.

In certain embodiments, the asset has a plurality of assigned sensors, and wherein normal status of the asset as indicated by the assigned sensors represents a digital twin of the asset.

In certain embodiments, the data originating from the plurality of sensors are transmitted to the data collection and normalization module by a communication mode selected from the group consisting of direct internet connection, WiFi, Bluetooth, cellular network, radiofrequency transmission and satellite communication, or any combination thereof.

In certain embodiments, the system further comprises one or more ingress modules for receiving the data originating from the plurality of sensors and verifying that the received data has originated from sensors authorized by the system.

In certain embodiments, the message is transmitted to the concerned party by email, SMS, or push messaging.

In certain embodiments, the action control module includes action rules dictating whether or not action is required in response to a change in the status state of the asset.

BRIEF DESCRIPTION OF THE DRAWINGS

Various objects, features and advantages of the invention will be apparent from the following description of particular embodiments of the invention, as illustrated in the accompanying drawings. Emphasis is placed upon illustrating the principles of various embodiments of the invention.

DETAILED DESCRIPTION

Rationale

Figure 1:
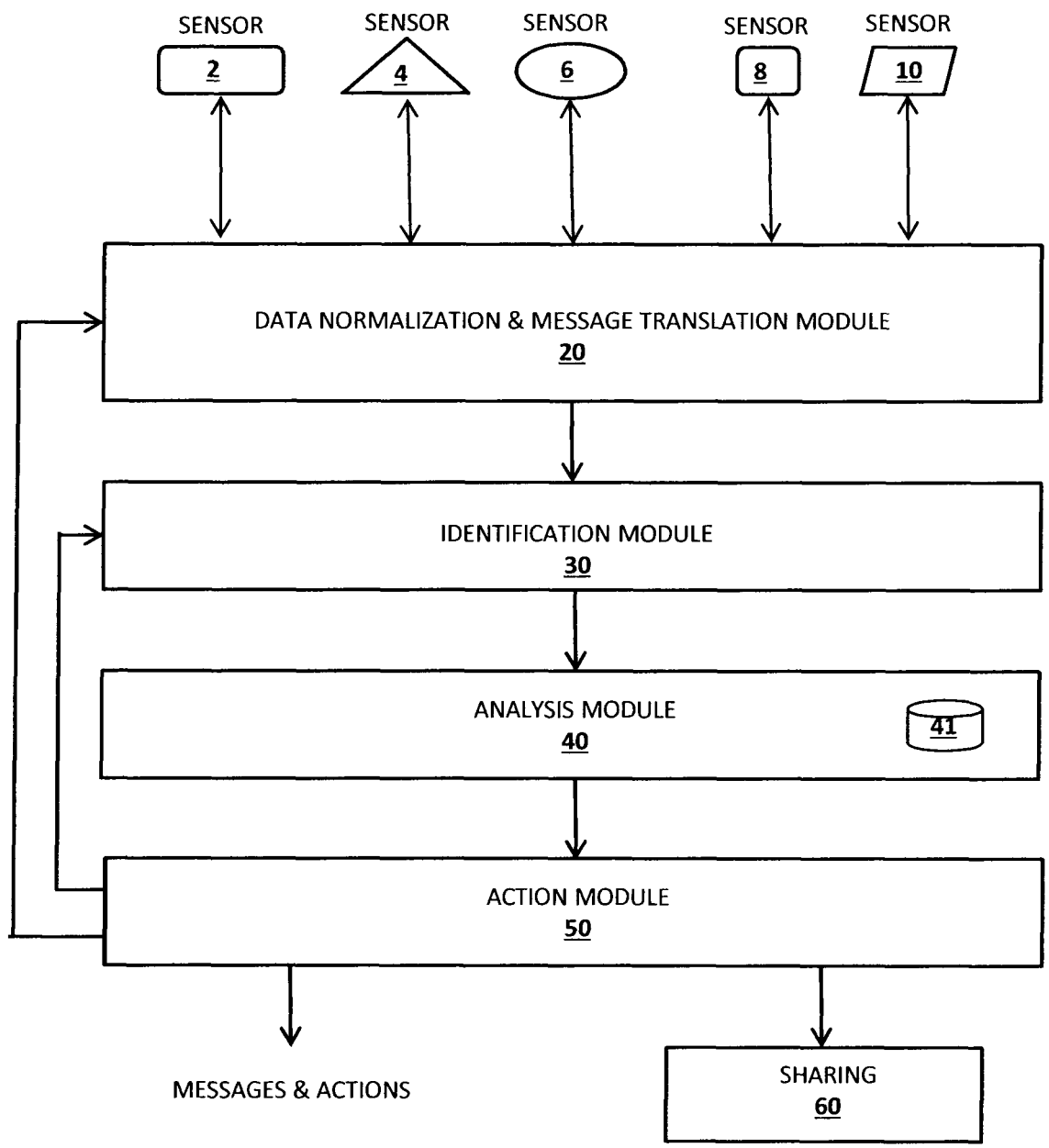
FIG. 1 is a block flow diagram of one embodiment of a system for monitoring individuals and equipment.

Most devices are not connected to a software platform which is designed to provide a scalable, exception-based, digital communication pipeline between the device user and a monitoring center. This is because most devices and software outcomes are typically designed for the user and are not easily adapted for monitoring at a monitoring center. Since a typical software user interface is designed for the user and not the monitoring center, it does not allow an integrated user interface at the monitor level, meaning the center must continually monitor different software to see all the different devices. This causes inefficiencies and errors.

Current software for monitoring status of individuals is typically provided as a vertically locked outcome. These providers are not designed to connect many types of devices and to normalize the input received from these devices to allow standardized presentation of information to the monitor or response center agent. Nor is there a standard communication protocol back to all these different devices.

Most software designed for monitoring safety and health of individuals and proper functioning of equipment does not allow for location-based group selection (targeted communications) or allow the monitor center to communicate back to many different devices and organizations to create a network of users capable of assisting in response, or to notify selected users of an emergency in their area.

Although some enterprise platforms exist; software applications relating to safety monitoring typically only messaging to family or friends and usually do not connect to a centralized professional monitor center. Connecting an individual to a monitoring center, on a consumer or business-to-consumer basis, is not widely available. Custom mapping overlays and integrating layers for different response agencies is also not common for the user being monitored.

In the past, these shortcomings have been addressed by voice-based check-in calls. As devices became available, the user interface software was designed vertically locked to that device and solely for the type of device with specific messages and events. Few efforts have been made to connecting the devices and the users to a monitoring center or to make the monitoring center more efficient by integrating feeds from all of the different devices into a single platform interface. As a result, monitoring centers often have many screens and applications going at the same time, essentially monitoring the user view. Cutting and pasting information between applications is typically required to create location outcomes and mapping for response dispatch. Embodiments of the present invention described herein are provided in an effort to address these shortcomings.

DEFINITIONS

As defined herein, an "asset" is one or more individuals, one or more units of functional equipment including vehicles, one or more buildings or structures, one or more defined locations, or any combination thereof.

As used herein, the term "digital twin" in the broadest sense refers to a construct representing a virtual model of an asset. A digital twin in context of certain embodiments described herein refers to a set of status parameters indicating the overall status of an asset. As known in the art, a digital twin can be used for monitoring, diagnostics and prognostics. In this field, sensor data is used to build digital twins. These models help to improve monitoring outcomes.

As used herein, the term "normalized data" refers to conversion of data arranged in one format into another standardized format for subsequent processing.

As used herein, the term "rule" refers to programmed logic which dictates how data generated by a sensor-associated asset is acted upon by embodiments of the system described herein. An example of a rule programmed for an individual is: "If heart rate data exceeds 180 BPM for a period of time greater than five minutes, generate event to check in with patient."

As used herein, the term "insight" refers to information indicative of the status of an asset.

As used herein, the term "event" refers to an insight or combination of insights and events which results in a change the state of an asset and/or a trigger of messages to be directed to responders.

As used herein, the term "sensor" refers to an instrument which detects changes in the physical environment and/or in living organisms and sends information pertaining to the changes to a computer which displays and/or processes the information.

As used herein, the term "device" refers to an apparatus provided with a plurality of sensors as defined above.

Overview of Applications

Various embodiments of the system described herein provide a software platform which integrates data representing messages from many different devices using multiple communications modes, to monitor safety and status of individuals and equipment, and combinations thereof, and to provide communication to obtain third-party responses in the event of exception alarms from status inferred from sensors and devices.

Embodiments described herein provide a system for monitoring many different assets (defined herein as one or more individuals, one or more units of functional equipment including vehicles, one or more buildings or structures, one or more defined locations, or any combination thereof) on a single software application configured for communication of sensor-generated data via many different communication modes. This increases the efficiency of the monitoring center which can locate many different devices on a single software application. The system communicates seamlessly with many different sensors and devices, using many different communications modes. This makes the monitoring center efficient and scalable for both business and consumer applications and allows different organizations and users to be linked together to create a response community. One particular network example represents a service provided by the applicant, which is known as SafetyNet.

These embodiments provide integration of data generated from devices such as mobile computing devices produced by different manufacturers such as Apple, Android and Blackberry or any device running on the Android operating system, as well as satellite and in-vehicle telematics devices, wearable devices and health monitoring devices, as well as any peripheral sensors connected thereto. In addition, these embodiments are compatible with integration of multiple third-party organizations that specialize in call response such as 911 centers, air ambulance providers and other contact centers.

Real-time alerts and notifications generated by the system are translated by the system into actionable procedures for the call response organizations enabling a guaranteed outcome for subscribers. The system can act as an information provider or broker between those who need assistance and those who can help and makes it possible for a monitoring center to act as a link between all devices and users. This scenario creates a new location-based response capability based on a digital network connecting all users. The same platform can be used for both business and consumer solutions.

Examples of monitoring applications that can be performed by embodiments described herein include, but are not limited to: student safety, journey management, evacuation management, employee notification, cognitive disorder management, child safety, worker safety, fatigue management and hazard prevention.

Examples of devices and sensors that can be used to generate data for these and other monitoring applications include, but are not limited to: satellite handheld communication devices, health and activity tracking devices, wearable devices, gas sensors, pressure sensors, temperature sensors, humidity sensors, precipitation sensors, wind sensors, vehicle-based modems, satellite trackers and mobile computing devices such as smartphones, tablets and smart watches. Communication modes used to transfer data from such devices and sensors to the monitoring system include direct Ethernet connection, cellular communication, WiFi, Bluetooth, ZigBee, LoRa, SigFox and satellite.

System Functionality

Embodiments of the monitoring system provide a platform which integrates messages from many different devices using multiple communications modes for monitoring status of assets known and enabling third-party responses in the event of exception alarms from status insights, events and biometric emergencies. The following paragraphs describe main functional aspects of the system.

Assignment of Devices/Sensors to Assets—

Linkage of devices and/or sensors to assets provides a means for transforming sensor/device data to an asset-specific meaningful data stream. Flexibility in the linkage arrangement allows for an asset to have multiple linked sensors or devices, allows devices to be reassigned from one asset to another, and allows for an individual asset to switch one device for another device without re-entering information pertaining to the asset, such as location, condition and activity, for example.

Bi-Directional Data Transmission—

The data normalization process converts data received from multiple different sensors to a normalized format for subsequent processing by the system to determine status states and issue messages if stipulated by the rules. In addition, it is desirable for status states to be returned to the device or sensor in certain situations. Therefore, the system also has the capability to de-normalize data representing a message to be directed to the device to place it into a format that can be received by the device.

Event Generation—

Event generation functionality manages the translation of one or more "insights" generated on the basis of sensor or device data into an "event." Events have the potential to change the state of an asset and cause the triggering of messages to be directed to responders. Rules governing the generation of events from data-based insights are in some embodiments, conveniently configured by users using a wizard-type interface. Generation of events will in some cases trigger asset state change requests. Event generation will also pass through state change requests or events which are directly generated by a sensor or device or by other components of the system.

An "event" is generated by a trigger, a combination of triggers and/or another event. Some examples include, but are not limited to:

Event=insight 1+insight 2+event 1+event 2
Unsafe journey (Event)=incorrect trip risk assessment answer (insight 1)+inclement weather (event 1)
Rollover event (Event)=accelerometer reading from in-vehicle device (insight 1)+gyroscope reading from in-vehicle device (insight 2)+asset type (insight 3)
Heart attack (Event)=elevated pulse rate from wearable sensor (insight 1)+short breathing detected from wearable sensor (insight 2)+insight 1 and insight 2 detected for longer than specific time range (event 1)

Insights are designed to characterize both individuals and assets and are dependent upon the type of asset (a person or a thing). For example, a high temperature alarm generated by a machine is not the same as elevated body temperature of a person and actions to be taken will vary accordingly in a manner which depends on the individual person or machine.

Insights depend on the type of sensor or device generating the data. For example, an alert due to fatigue may be accomplished in different ways depending upon the devices available. Combinations of such sensor data can include, but are not limited to: accelerometer data, heart rate data and neurological sensors.

Generated events are processed by a separate functionality designated herein as "asset state handling" described hereinbelow.

Asset State Handling—

The state handling functionality of the system manages requested changes to an asset. Such changes may include, for example, condition, location or activity of a given asset. This is accomplished using data generated by assignment of devices/sensors to assets (functionality described above). Such changes may also be initiated upon expiry of event timers. The set of status parameters indicating the overall status of an asset is the digital twin of the asset. The digital twin represents the characteristics of the person or thing being monitored. These characteristics are required to provide a baseline to determine the impact of changing information about the asset.

Asset state handling functionality is capable of controlling changes in the state of the asset. For example, the asset state handling functionality determines the asset's current state, processes a state change request and the sensor/device associated with the request to determine if timers or the asset's current state are in need of updating. Thus the conditions being evaluated by this functionality are the asset's current status, the requested insight action and the asset's new status. The asset state handling functionality will then respond to either allow or deny the status change. In one example, a person is in a normal state and an SOS event is received and processed by event generation. The SOS might come directly from the device or externally from another emergency notification as a result of a natural disaster such as forest fire or a tsunami. The status change is allowed by the asset state handling functionality and the person is set into the SOS state. In another example, a person is overdue for a safety check-in. A request to change the status of the person is received and processed by event generation. The Asset state handling functionality allows the status change and responds by changing the person's status to "Hazard" status.

In an example of denial of a status change, a person is in an SOS state and a safety check-in is received, the state handling functionality rejects the check-in which would result in a return to normal state and leaves the user in an SOS state because the rules dictate that this is not acceptable automatically (the safety of the person must be verified by real time response personnel before the SOS state can be cleared).

Messaging—

The messaging functionality manages all communication between the levels of functionality of the system. In one embodiment, the messaging functionality ensures that messages used for all internal communications of the system are processed based upon time generated rather than time received. One example of such communication protocol is the Kafka communication protocol. The Kafka communication protocol provides a highly scalable communication infrastructure along with guaranteed order of messages traversing the system. Different communication protocols process messages at different speeds. A message sent from a satellite device may arrive later than a message sent via a cellular network even though it was sent earlier, or two satellite messages may arrive in reverse order from when they were transmitted. Therefore, the Kafka communication protocol ensures that all messages are received in the system in the order that they were generated. This eliminates potentially incorrect decisions being made by the state handling and event generation functionalities. Also, if at any time one service fails, the Kafka communication protocol will rebalance the load on the remaining instances of that service. Other communication protocols similar to the functionality provided by Kafka may also be used in alternative embodiments of the system.

Response Center UI/UX—

In some embodiments, the system includes an interface provided at a response center with the aim of ensuring a guaranteed outcome for alerts and notifications which is optimized to minimize operator intervention to complete tasks. This interface includes aspects of user interface design (UI) and user experience design (UX). Elements of the interface include provision for asset history review for all sensors/devices, platform components and response center actions including all messages sent and received. A complete history of all actions and events by all components facilitates a detailed understanding of an event. The asset history review includes the ability to view all steps in the process of resolving an event as viewed by response center personnel and remote devices. Time stamps are attached to all messages to identify abnormalities in communications, infrastructure and applications.

Another feature provided in some embodiments of the response center UI/UX is "one touch/self serve asset and device creation and onboarding" to minimize work by response center personnel and enable remote device users to choose among unique options for devices.

Another feature provided in some embodiments of the response center UI/UX is "self serve user defined escalation management and control." This feature allows the remote device asset to define unique event escalation paths. Once defined by the user, the UI/UX generates a custom escalation procedure for use by the response center personnel for that remote device user.

Another feature provided in some embodiments of the response center UI/UX is the ability to view the asset state in a grid view with real-time sorting based on asset timers and states. In one embodiment, once an alert has been received, and the response center operator takes control of the event, the UI/UX focuses on the event and all relevant information is presented, thereby facilitating a subsequent response. An "event action screen" includes—a universal search, real-time filtering for that asset, all previous actions by that asset in an asset activity feed, current asset status (location, condition, activity) and identification of all nearby active assets. Additionally, audible and visual alerts ensure that monitor center operators are aware of the need for assistance.

Another feature provided in some embodiments of the response center UI/UX is an active map display with auto zoom which provides a means for visualizing a network of assets. The assets are viewable in multiple formats including, latitude/longitude, address, legal subdivision, and other location systems. The active map display provides a means for geofencing for creation of alerts. For example, if an asset passes into or out of a geo-fenced area: a multi-asset notification is issued for all assets within a geo-fenced area by raising an SOS on the remote device user within the geo-fence. Customer-based or response center custom maps are configured for integration with the response center UI/UX.

Process Flow within System Embodiments

Various aspects of the invention will now be described with reference to the figures. A number of possible alternative features are introduced during the course of this description. It is to be understood that, according to the knowledge and judgment of persons skilled in the art, such alternative features may be substituted in various combinations to arrive at different embodiments of the present invention.

Embodiment 1

With reference to FIG. 1, there is shown a block diagram of one embodiment of the invention. Flow of data occurs in more than one direction as shown by a number of lateral, upward and double-headed arrows. For the sake of preserving clarity, the flow of data will be initially described with respect to the downward-pointing arrows throughout the entire diagram. Five sensors 2, 4, 6, 8 and 10 are shown in this example (however, it is to be understood that any number of sensors may be used to generate data for processing by the system). The different geometric shapes assigned to the sensors and devices of the sensing level are provided to indicate that these components differ from each other and are provided for the purpose of generating and transmitting data representing states of different parameters. Although indicated as "sensors" these components are either single stand-alone sensors, or are integrated within a single multi-sensor device such as a smartphone or safety pendant for example (not shown in FIG. 1). The sensors are configured to send a stream of data to the data normalization and message translation module 20. Depending upon availability of network communication modes, the transmission may occur through a direct internet connection, WiFi, Bluetooth, cellular network, radio transmission (via a protocol such as ZigBee, for example) or satellite communication. Methods and systems for selecting communication modes based on availability and cost are described in US Patent Application No. 2015/0282061, which is commonly owned and incorporated herein by reference in its entirety).

Data packets generated by the sensors 2, 4, 6, 8 and 10 are converted to a normalized format for subsequent processing by the system. The data normalization and message translation module 20 thus includes a processor programmed with all the data conversion algorithms required to handle all formats of data generated by the sensors 2, 4, 6, 8 and 10. Module 20 is provided to address the fact that various manufacturers of sensors and devices will use different formats for packaging and transmitting data. This module 20 converts or normalizes the data to permit continued processing in the system.

The normalized data is transferred to the identification module 30, where information regarding the sensor from which it was generated is associated with an asset. As defined herein, an "asset" is one or more individuals, one or more units of equipment including vehicles, one or more buildings or structures, one or more defined locations, or any combination thereof). All operations relating to assignment of sensors or devices to an asset are performed in the identification module 30. Such operations include rule sets for association of sensors/devices with assets. Such rule sets are provided to prevent inappropriate association with of certain sensors with certain assets. For example, an oil pressure sensor should not be associated with an individual and a personal safety pendant should not be associated with a generator.

After processing by the identification module 30, the data is transmitted to the analysis module 40. The analysis module 40 includes a database 41 containing asset rules which define status states for each asset contained therein. The analysis module 40 is programmed to compare packets of the normalized data with specified asset rules to determine a status state of the asset. The status state is transmitted to the action module 50.

The action module 50, receives the status state of the asset and subjects the status state to a set of action rules dictating whether or not action is required (such as requesting a maintenance call or a rescue from a third party, for example). Additionally the action rules will dictate whether or not a confirmatory message should be sent back to the device or sensor which generated the data which resulted in a change in the status state of the asset.

Certain embodiments of the monitoring system will also include a sharing module 60 where information generated by the system regarding status states of assets is viewable on a graphical user interface and shared with other parties via the internet or other communication systems, for example.

Embodiment 2

Figure 2A:
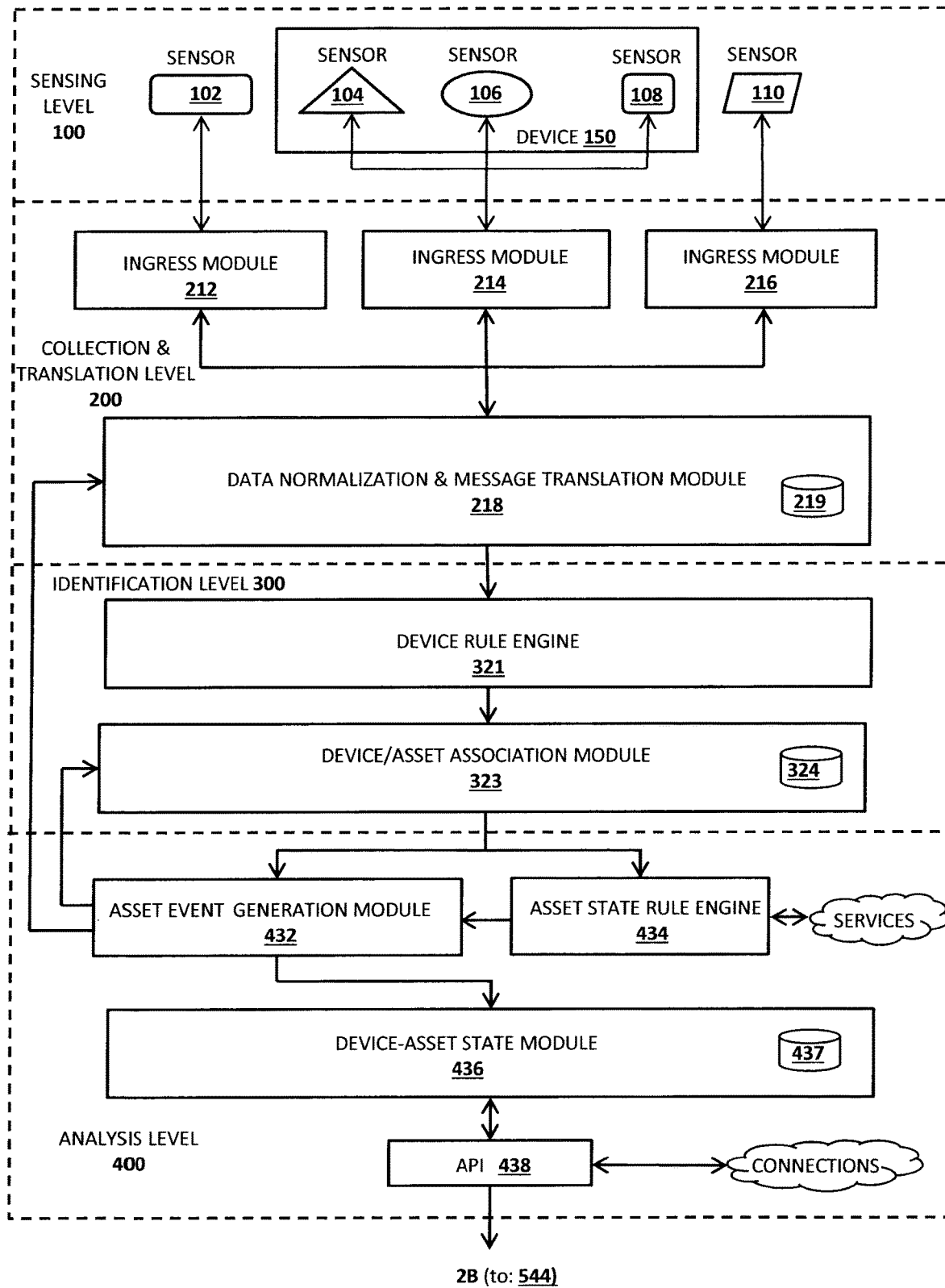
FIG. 2A is a block flow diagram of a first section of a second embodiment of a system for monitoring individuals and equipment.
Figure 2B:
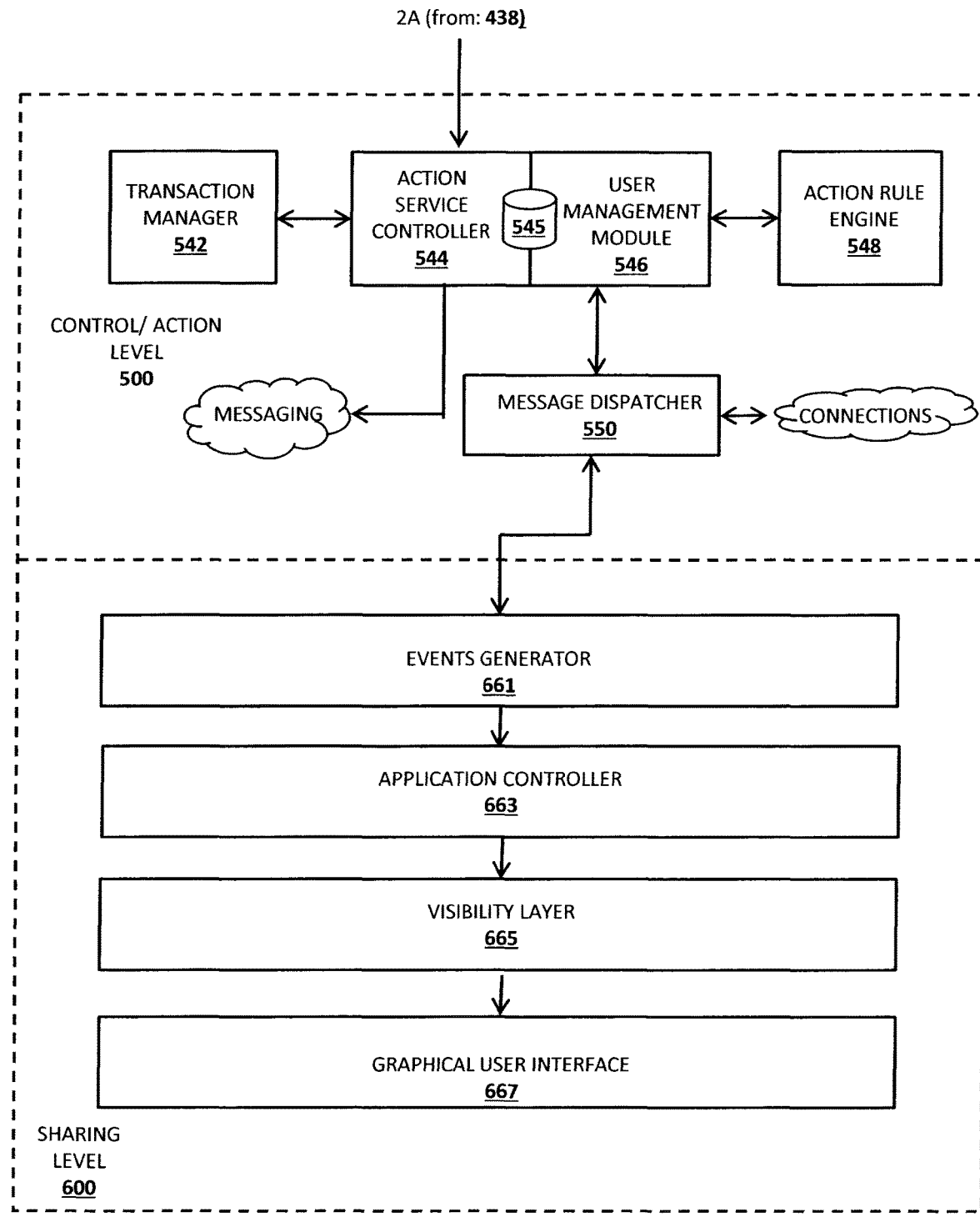
FIG. 2B is a block flow diagram of a second section of the second embodiment of a system for monitoring individuals and equipment.

Turning now to FIGS. 2A and 2B, there is shown a block flow diagram indicating the flow of data and actions driven by another embodiment of the integrated monitoring system. For the purposes of facilitating the various levels of the system, the entire system can be considered to include five levels of actions which generally correspond to the modules described for the embodiment of FIG. 1 with additional features and functions illustrated. There is shown a sensing level 100, a data collection and translation level 200, an identification level 300, an analysis level 400, a control/action level 500, and a sharing level 600. The functional components at each level are identified using the same base reference numerals (for example all of the sensors of the sensing level are identified using reference numerals in the 100 series). It is seen in FIGS. 2A and 2B that flow of data occurs in more than one direction as shown by a number of double-headed arrows. For the sake of preserving clarity, the flow of data will be initially described with respect to the downward-pointing arrows throughout the entire diagram extending across FIGS. 2A and 2B and then horizontal and upward data flow will be described, where applicable.

It is seen in the sensing level of this example embodiment, there are five different sensors or devices 102, 104, 106, 108 and 110. In this embodiment it is to be understood that the sensors 102, 104, 106, 108 and 110 each provide a stream of data reflecting the state of at least one parameter. Sensors 104, 106 and 108 are illustrated as part of a larger device 150 such as a smartphone for example, while sensors 102 and 110 are stand-alone sensors. The different geometric shapes assigned to the sensors of the sensing level are provided to indicate that these sensors differ from each other and are provided for the purpose of generating and transmitting data representing states of different parameters. Examples of useful types of data transmitted by such sensors and devices include, but are not limited to, temperature, barometric pressure, humidity, wind speed, vehicle speed, location (by GPS for example) and oil pressure of an engine-driven unit of equipment such as a vehicle or a gas-powered generator for example. As defined herein, an "asset" is an individual, a group of individuals, a unit or group of units of equipment, or any combination thereof). Each sensor may be associated with a single relatively simple asset such as a unit of functioning equipment or an individual. It is possible for multiple sensors to be associated with a given asset.

It is seen that data generated at the sensing level is transferred to the collection and translation level 200. Thus, data from sensor 102 is transmitted to ingress module 212, sensors 104, 106 and 108 transmit data to ingress module 214 and sensor 110 transmits data to ingress module 216 (transmission of data from the sensors to the ingress modules 212, 214 and 216 is effected by any available communication network such as direct internet connection, WiFi, Bluetooth, cellular network, radio transmission (via a protocol such as ZigBee, for example) or satellite communication, as described above. The three different ingress modules 212, 214 and 216 are illustrated to indicate that the components of the collection and translation level may be varied to conveniently handle data in different formats for the purpose of ingress filtering wherein data packets are verified to originate from authorized devices and sensors. Thus, the collection and translation level 200 is configured for convenient modification to handle data from newly added devices and sensors by addition of additional ingress modules if required (or removal of ingress modules if not required) to conveniently handle the incoming data packets. Once verified by the ingress modules 212, 214 and 216, the received data is transmitted to the data normalization and message translation module 218 where data packets generated by the sensors 102, 104, 106, 108 and 110 are converted to a normalized format for subsequent processing by the system. The data normalization and message translation module 218 thus includes a processor programmed with all the data conversion algorithms required to handle all formats of data generated by the sensors 102, 104, 106, 108 and 110. Module 218 is provided to address the fact that various manufacturers of sensors and devices will use different formats for packaging and transmitting data. This module 218 converts or normalizes the data to permit consistent integrated analysis at the analysis level 300 of the system in order to increase the processing efficiency of the system. Module 218 includes a database 219 which includes identifiers for a plurality of different data packets and a collection of authorized sensors/devices as well as historical device data (data previously recorded and stored for each device). Upon receipt of a data packet, module 218 queries the database to determine the format of the received data packet. Upon identification of the format, a series of programmed data manipulations are performed by module 218 to place the data into the system normalized packet format (with normalized field names and values, for example). When complete, the normalized data are transferred to the identification level 300 of the system.

In the identification level 300 of the system, the normalized data enter the device rule engine 321. If a normalized data packet indicates that the identifier of the device from which the data packet is not associated with an asset (which may be an individual, a group of individuals, a unit or group of units of equipment, or any combination thereof), the data packet will be discarded without further processing to conserve processing power. If there is an identifier associated with the data packet, the data packet is transferred to the device/asset association module 323 which includes a database 324 including all devices and assets. The device rule engine 321 also compares data values to rules defined for that device. In some cases, the rules lead to generation of data representing alert messages which are forwarded to the Device/Asset Association module 323.

The device/asset association module 323 is provided to ensure that each device/sensor being monitored is properly assigned to asset. The device/asset association module is accessible via the two way arrows leading from the central application programming interface (API) 438 which will be described below. For example, the database 324 could stipulate that a specific oil pressure sensor is associated with a specific generator. The normalized data arriving at the device/asset association module 323 is verified against the database to verify the assignment. This module 323 is also used to make new assignments of existing devices/sensors, to add new devices/sensors to the database 324 and to generate or modify new asset combinations. The database 324 also includes the asset-device relationships.

Data packets transmitted from the device/asset association module 323 move to the analysis level 400 and are transmitted to both the asset event generation module 432 and the asset state rule engine 434.

The asset state rule engine 434 determines if the data is within acceptable limits set by the rules. As data assigned to a specific asset enter the asset state rule engine, rules for the individual asset, type of asset, and client are compared against the data. If the conditions of each rule are met, data may be transmitted to generate messages. Such messages are fed into the event generation module 432, and status change requests are processed by the asset state rule engine 434, to determine if the requested status is permissible.

In order to enforce the consistency of status states, any status change requests entering the asset state rule engine 434 (for example, from the "services" cloud shown in FIG. 2A) will be compared against the client-defined rules in the asset state rule engine 434. For example, if the asset referenced in the status change request is currently in a state of SOS (urgent need for rescue) as a result of data transmitted by a sensor associated with the asset, and a request is received from the asset for the status indicating a lower-level request for assistance, the lower-level request will be rejected due to the fact that an SOS status state is a higher priority. If an "SOS Cancel" notification is received from the asset, and the asset is in an SOS status state, the Asset State Rule Engine 434 will transmit a new message confirming the status change into the Event Generation module 432.

Since every message that reaches the event generation module 432 is verified and approved by upstream modules in the block flow diagram, such messages are routed to the intended destination as described in more detail below. In the case of messages triggered by sensor data, the messages are routed to the device/asset state module 436. Otherwise, the messages are routed to the data normalization and message translation module 218 (as indicated by the outer left side arrow emerging from the asset event generation module 432). Additionally, any new messages are routed back to the device/asset association module 323 (as indicated by the inner left side arrow emerging from the asset event generation module 432) to be processed for additional rules.

All messages processed by the device/asset state module 436 are synchronized across the cluster into in-memory caches, and persisted into an associated database 437. All messages that are processed in this component are forwarded onto the application programming interface (API) 438 for distribution to API connections. The API 438 is a simple module provided to route all outbound messages to connections authorized to view the client associated with the message and to provide a means for sending incoming messages back to the device/asset state module 436.

When messages are routed out of the API 438, they move to the control/action level 500 (FIG. 2B) and enter the action service controller 544 which provides permissions and an authentication layer for end users, as well as a connection to all external messaging services such as email, SMS and push messaging. The action service controller 544 is also connected to a user management module 546 which records all users engaging the system and includes the permissions and roles associated with a user. The user management module 546 is linked for two-way communication with a module herein designated the action rule engine 548 which includes rules for actions permitted by users, including the actions that can be taken by a user affecting the devices and assets in the system. The action service controller 544 is also linked by two-way communication with a transaction manager module 542 which records actions taken and determines order and routing of actions. A database 545 is associated with both the action service controller 544 and the user management module 546. The user management module 546 is linked for two-way communication with a message dispatcher 550 which is linked to other connections authorized to view messages and to provide a means for sending incoming messages back to the message dispatcher 550.

The message dispatcher 550 also has a two-way communication link with the sharing level 600 which provides for interactions with underpinning services in addition to providing map interfaces and other features such as visual creation of geofences, for location-based alerts and messaging. Shown as components of the sharing level are an events generator 661 which generates events in a format suitable for shared view by a person through a graphical user interface (GUI) 667, an application controller 663 which controls applications for display of the shared events and translates user interaction (e.g. button press and text from the GUI 667) to data usable by the platform, a visibility layer 665, which provides connectivity for two-way processed information to the GUI 667. The GUI 667 provides a means for a user to interact with the system and devices connected to the system.

The system is configured for transmission of messages to devices and sensors from the asset event generation module 432 back to the sensors 102, 104, 106, 108 and 110 via the data normalization & message translation module 218 which receives the message and translates it to data formatted for receipt by the sensors 102, 104, 106, 108 and 110 in cases where it is beneficial for the sensors to receive such messages. One such example would be a personal safety pendant device assigned to an asset representing an individual (such as the safety pendant described in US Patent Application No. 2015/0282061, which is commonly owned and incorporated herein by reference in its entirety). The safety pendant provides the means to generate an SOS message which enters the monitoring system via a satellite-based communication mode, for example. Since it is desirable for a person generating an SOS message to know that the message has been received and processed by the system as far as the asset event generation module, the asset state rule engine 434 would have a rule indicating that a confirmatory message is to be transmitted back to the safety pendant, which would then initiate a signal such as a blinking green light, for example, to inform the individual that a rescue operation has been initiated (this message would be transmitted to the data normalization & message translation module 218 and back through the appropriate ingress module to the safety pendant as indicated by the upward arrows in FIG. 2A). On the other hand, a confirmatory message may not be required in other cases such as, for example, an oil pressure sensor on a remote generator operating without any operators on site would not require a confirmatory message so the asset state rule engine 434 would not include a rule indicating that a message is to be sent to the oil pressure sensor.

A summary of the functionality of each of the components of the flow diagram of FIGS. 2A and 2B is provided in Table 1 below.

TABLE 1

Functionality of Components of FIG. 2

| Component Name | Reference Numerals (FIG. 2) | Functions |
|---|---|---|
| SENSORS/DEVICES | 102, 104, 106, 108, 110 | Generates & transmits data/receives messages (in some cases), a device typically includes multiple sensors |
| INGRESS MODULES | 212, 214, 216 | Ensures that data arrives from authorized sensors in an accepted format from multiple communication protocols (e.g. direct internet, WiFi, Bluetooth, cellular, satellite, ZigBee radio, wired) |
| DATA NORMALIZATION & TRANSLATION MODULE WITH DATABASE | 218, 219 | Converts incoming sensor data to normalized format/translates normalized data representing status to outgoing device readable data—database 219 includes collection of authorized devices and functions as well as historical device data |
| DEVICE RULE ENGINE | 321 | Processes data through rule sets pertaining to devices (prevents improper association of devices with assets) |
| DEVICE/ASSET ASSOCIATION MODULE WITH DATABASE | 323, 324 | Allows programmer to associate devices with assets (via API 438)—database 324, which includes the asset to device relationship |
| ASSET STATE RULE ENGINE | 434 | Processes data through rule sets pertaining to states of assets |
| ASSET EVENT GENERATION MODULE | 432 | Generates events based on states of assets—events are transmitted back to the sensors/devices in some cases, and sent to the device/asset association module in some cases |
| DEVICE-ASSET STATE MODULE WITH DATABASE | 436, 437 | Records the status of assets in database 437 and transmits status data to the API |
| API | 438 | Distributes messages indicating asset status to authorized connections—sends messages to action service controller |
| ACTION SERVICE CONTROLLER | 544 | Forwards messages to messaging services such as email, SMS and push—saves transmitted messages in database 545 which is shared with the user management module |
| USER MANAGEMENT MODULE | 546 | Records all users engaging the system and includes the permissions and roles associated with a user—is linked to the action rule engine |
| ACTION RULE ENGINE | 548 | Processes data through rule sets pertaining to actions permitted by users, including the actions that can be taken by a user affecting devices and assets in the system. |
| TRANSACTION MANAGER | 542 | Records transactions and determines order and routing of actions |
| MESSAGE DISPATCHER | 550 | Receives messages from the user management module and sends messages to authorized connections (such as 911 and other responder services), sends event data to the events generator |
| EVENTS GENERATOR | 661 | Generates events in a format suitable for shared view by a |

TABLE 1-continued

Functionality of Components of FIG. 2

| Component Name | Reference Numerals (FIG. 2) | Functions |
| --- | --- | --- |
| | | person through a graphical user interface (GUI) |
| APPLICATION CONTROLLER | 663 | Controls applications for display of the shared events and translates user interaction (e.g. button press and text from the GUI) to data usable by the platform |
| VISIBILITY LAYER | 665 | Provides connectivity for two-way processed information to the GUI |
| GRAPHICAL USER INTERFACE (GUI) | 667 | The GUI for a person to interact with the system and devices connected to the system |

Example 1: Monitoring of an Individual with a Medical Condition

In one example, an individual with a medical condition involving occasional abnormal heart rate and/or abnormal blood pressure is monitored outside of a medical facility by five different wearable sensors including; (i) a heart rate monitor; (ii) a blood pressure monitor; (iii) a GPS receiver; (iv) an accelerometer; and (v) a gyrometer connected to the system embodiment of FIG. 1. Thus the combination of these data classes for this individual may represent the status of a digital twin of the individual at any point in time. In this example, all five of the sensors used to generate the digital twin data are obtained from different manufacturers and generate data in different formats. Data generated by the sensors is monitored automatically and remotely. A constant data stream from all sensors is transmitted wirelessly to a messaging proxy hub in the individual's home which then relays the data to the system platform via the internet. The data enters the system and the data normalization module 20 converts it to a normalized format. The dataset is then transferred to the identification module 30 for assigning the monitoring devices/sensors to the asset (individual). The dataset is then transferred to the analysis module 40 which includes a database of rules for processing incoming data and issuing status messages and/or alerts with the rules customized for the individual. In this example, the heart rate sensor data and blood pressure data exceed the normal range for the individual, the GPS receiver data indicates that the individual is at his residence, and the accelerometer data and the gyrometer data indicate a likelihood that the individual has fallen and is now motionless. The set of rules specific for the individual with the outcome in this case is issuance of an urgent alert message automatically transmitted to a concerned third party responder such as a 911 service. This last step is performed via the action module 50. The message indicates that there is a medical emergency at the individual's residence. Information about the ongoing health condition of the individual could optionally be provided to the responder along with the message.

Another possibility using the same individual, sensors and platform system is that the heart rate data are above normal but all other data streams are within normal ranges. The analysis module 40 processes the normalized data and after running through the specified rule set, the outcome is simply to continue to monitor as usual without taking any automatic action to alert the third party responder, or alternatively issuance of an instruction to increase monitoring frequency by transmission of sensor data to the system platform more frequently.

Example 2: Monitoring of Functioning Infrastructure of a Building

It is to be understood that the same principles of monitoring status of individuals such as in Example 1, can be applied to monitoring of proper functioning of equipment such as vehicles in motion, or stationary equipment such as generators, pumps, heating-ventilation-air conditioning (HVAC) systems and the like. In the present example, the functioning infrastructure of a building for housing workers at a remote arctic work site camp powered by diesel generators is monitored. In this simplified example, the generators and the HVAC system of the building are monitored. In the winter, a lack of heat can result in severe consequences and therefore a sensor-based indication that the main furnace is malfunctioning represents a major event requiring immediate attention. The analysis module of the system would include a rule indicating that a furnace malfunction is a high level alert to be addressed immediately by dispatching an HVAC specialist to the work site via the event generation functionality.

On the other hand, an indication of low oil pressure from a sensor associated with one of the five generators at the worksite could be considered an event considered not to be particularly dangerous. The analysis level of the system would include a rule indicating that the oil pressure alert is a low-level maintenance alert to be addressed within 24 hours by personnel residing at the work camp to attend to routine maintenance of the generator.

Example 3: Monitoring of a Work Group Asset Including Workers and Equipment

Another situation applicable to embodiments of the system described herein is to collectively monitor a combination of individuals and equipment, including vehicles collectively represent an asset operating under conditions of extremely cold temperatures, representing hazardous conditions for the workers. Thus, a set of rules is developed to define conditions which would require alerts and/or actions to address problems at the worksite. The workers each carry a safety pendant device with sensors providing data indicating the worker's safety status and units of equipment each have sensors for providing data regarding proper functioning of the equipment. One possible arrangement relates to systems and methods described in U.S. patent application Ser. No. 15/172,818 which is commonly owned and incorporated herein by reference in its entirety. This document describes systems and methods for monitoring a convoy of vehicles traveling on an ice road. Temperature sensors inside the vehicles to register sudden drops in temperature, vehicle sensors to determine speed and GPS receivers to provide location data. An accident involving a vehicle results in transmission of data through the system and produces a series of data-based insights that would stipulate rule-based event generation to require immediate rescue of the driver of the vehicle and deployment of additional assets to attempt to recover the vehicle from the accident site. This could include notification to the trailing driver of the convoy (which is part of the workgroup and also part of the asset) to stop his or her vehicle and approach the accident scene on foot to assess the accident and/or lend rescue assistance. The rules could further stipulate that a check-in is required by the trailing driver within a specified period of time.

EQUIVALENTS AND SCOPE

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency, or any suitable combination of the foregoing.

Computer program code for carrying out operations for aspects of the present disclosure may be written in any combination of one or more programming languages, including an object-oriented programming language, conventional procedural programming languages, and dynamic programming languages or other programming languages. Data transmission may be effected through any type of network, including a local area network (LAN) or a wide area network (WAN), or a connection may be made to an external computer (for example, through the internet using an internet service provider) or in a cloud computing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Such computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

The invention claimed is:
1. A computer-based monitoring and messaging system for monitoring status of a plurality of assets, the system comprising:
   a) a data collection and normalization processor configured to accept data originating from a plurality of sensors and to convert the data to normalized data for subsequent processing by the system;

b) an identification processor in data communication with the data collection and normalization processor, the identification processor configured to receive the normalized data and assign a subset of the normalized data generated by one or more specific sensors of the plurality of sensors to an asset selected from a plurality of assets;

c) an analysis processor in data communication with the identification processor, the analysis processor comprising a database of asset rules defining status states of the asset, the analysis processor programmed to receive and compare the subset of normalized data with a subset of asset rules to determine a status state of the asset;

d) an action processor in data communication with the analysis processor, the action processor configured to receive the status state of the asset, generate a message representing the status state of the asset and transmit the message to a concerned party; and e) one or more ingress processors for receiving the data originating from the plurality of sensors and verifying that received data has originated from the plurality of sensors authorized by the system.

2. The system of claim 1, further comprising a sharing processor in data communication with a graphical user interface allowing a user to view a representation of the plurality of sensors and the plurality of assets and to change the asset rules and definitions of the status states.

3. The system of claim 1, wherein each one of the plurality of assets comprises one or more individuals, one or more units of equipment including vehicles, one or more buildings or structures, one or more defined locations, or any combination thereof.

4. The system of claim 1, wherein the identification processor is in data communication with a user interface for linking data originating from the specific sensors with the asset, thereby providing ability to change a definition of the asset.

5. The system of claim 1, wherein the data collection and normalization processor comprises an identification database including identification information for the plurality of sensors and the plurality of assets.

6. The system of claim 5, wherein the identification database is configured to store data generated by the plurality of sensors.

7. The system of claim 1, wherein the identification processor is programmed to prevent unauthorized assignment of a given sensor of the plurality of sensors to a given asset.

8. The system of claim 1, wherein the analysis processor is in data communication with an application programming interface for adding, removing or modifying the asset rules, thereby providing ability to change one or more definitions of status states.

9. The system of claim 1, wherein the analysis processor includes a database which includes one or more relationships between specific sensors of the plurality of sensors with specific assets of the plurality of assets.

10. The system of claim 1, wherein the concerned party is any one of or a combination of a rescue response team, a repair or maintenance team and a medical response team.

11. The system of claim 1, wherein the concerned party is an individual associated with the asset and the message is routed back through the system and translated in the data collection and normalization processor to data readable by a device associated with the asset.

12. The system of claim 1, wherein the action processor stores a copy of the transmitted message in a message database.

13. The system of claim 1, wherein the asset has a plurality of assigned sensors, and wherein normal status of the asset as indicated by the assigned sensors represents a digital twin of the asset.

14. The system of claim 1, wherein the data originating from the plurality of sensors are transmitted to the data collection and normalization processor by a communication mode selected from the group consisting of direct internet connection, WiFi, Bluetooth, cellular network, radiofrequency transmission and satellite communication, or any combination thereof.

15. The system of claim 1, wherein the message is transmitted to the concerned party by email, SMS, or push messaging.

16. The system of claim 1, wherein the action processor includes action rules dictating whether or not action is required in response to a change in the status state of the asset.

17. A computer-based monitoring and messaging system for monitoring status of a plurality of assets, the system comprising:

a) a data collection and normalization processor configured to accept data originating from a plurality of sensors and to convert the data to normalized data for subsequent processing by the system;

b) an identification processor in data communication with the data collection and normalization processor, the identification processor configured to receive the normalized data and assign a subset of the normalized data generated by one or more specific sensors of the plurality of sensors to an asset selected from a plurality of assets;

c) an analysis processor in data communication with the identification processor, the analysis processor comprising a database of asset rules defining status states of the asset, the analysis processor programmed to receive and compare the subset of normalized data with a subset of asset rules to determine a status state of the asset; and d) an action processor in data communication with the analysis processor, the action processor configured to receive the status state of the asset, generate a message representing the status state of the asset and transmit the message to a concerned party, wherein the identification processor is programmed to prevent unauthorized assignment of a given sensor of the plurality of sensors to a given asset.

18. A computer-based monitoring and messaging system for monitoring status of a plurality of assets, the system comprising:

a) a data collection and normalization processor configured to accept data originating from a plurality of sensors and to convert the data to normalized data for subsequent processing by the system;

b) an identification processor in data communication with the data collection and normalization processor, the identification processor configured to receive the normalized data and assign a subset of the normalized data generated by one or more specific sensors of the plurality of sensors to an asset selected from a plurality of assets;

c) an analysis processor in data communication with the identification processor, the analysis processor comprising a database of asset rules defining status states of the asset, the analysis processor programmed to receive and compare the subset of normalized data with a subset of asset rules to determine a status state of the asset; and d) an action processor in data communication with the analysis processor, the action processor configured to receive the status state of the asset, generate a message representing the status state of the asset and transmit the message to a concerned party, wherein the asset has a plurality of assigned sensors, and wherein normal status of the asset as indicated by the assigned sensors represents a digital twin of the asset.

* * * * *